(12) United States Patent
Rajashekar et al.

(10) Patent No.: US 12,554,612 B2
(45) Date of Patent: Feb. 17, 2026

(54) CONSOLIDATED MULTI-CHANNEL MULTI-USER OPERATIONS MANAGEMENT USING AGENTS

(71) Applicant: International Business Machines Corporation, Armonk, NY (US)

(72) Inventors: Santosh Rajashekar, Bangalore (IN); Selvi John, Bangalore (IN); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/732,772

(22) Filed: Jun. 4, 2024

(65) Prior Publication Data
US 2025/0370894 A1     Dec. 4, 2025

(51) Int. Cl.
*G06F 11/30* (2006.01)

(52) U.S. Cl.
CPC ...... *G06F 11/3068* (2013.01); *G06F 11/3006* (2013.01)

(58) Field of Classification Search
CPC ............. G06F 11/3068; G06F 11/3006; H04L 41/069; H04L 43/0817
See application file for complete search history.

(56) References Cited

U.S. PATENT DOCUMENTS

| | | | |
|---|---|---|---|
| 10,431,106 B1 | 10/2019 | Tolland et al. | |
| 10,504,043 B2 | 12/2019 | Fedak | |
| 2004/0117394 A1 | 6/2004 | Chopra et al. | |
| 2005/0187940 A1 | 8/2005 | Lora et al. | |
| 2010/0275054 A1 | 10/2010 | Grace et al. | |
| 2017/0163498 A1* | 6/2017 | Fisher | H04L 41/5032 |
| 2020/0329144 A1 | 10/2020 | Morgan et al. | |
| 2022/0004951 A1* | 1/2022 | Santhar | G06Q 30/04 |
| 2022/0058589 A1 | 2/2022 | Qian et al. | |
| 2023/0336507 A1 | 10/2023 | Limaye et al. | |
| 2025/0232245 A1* | 7/2025 | Schoch | G06Q 10/06393 |

FOREIGN PATENT DOCUMENTS

CN     104950836 A     9/2015

OTHER PUBLICATIONS

Hawkeye, Hawkeye CSOC (Security Operations Center) WIKI, 2024.
Innovapptive, Streamline Operations, Elevate Performance: The Future of Shift Handovers is Here, 2024, https://www.innovapptive.com/digital-shift-handover-solution.

(Continued)

*Primary Examiner* — Caroline H Jahnige
(74) *Attorney, Agent, or Firm* — Garg Law Firm, PLLC; Rakesh Garg; Elliot J. Shine

(57) ABSTRACT

An embodiment configures a first agent to monitor a first communication channel from a first client. An embodiment converts, by the first agent, a first communication to a central format, the first communication received via the first communication channel in a first format at a first time. An embodiment extracts, by the first agent, first incident data from the first communication. An embodiment extracts, from an incident database, by a central agent at a second time later than the first time, first client data including the first incident data.

20 Claims, 5 Drawing Sheets

(56) References Cited

OTHER PUBLICATIONS

Atlassian, Escalation policies for effective incident management, 2024, https://www.atlassian.com/incident-management/on-call/escalation-policies#what-is-incident-escalation.

Beekeeper, Resolve Frontline Disconnect, 2024, https://www.beekeeper.io/frontline-success/.

Microsoft Build, Manage the Shifts app for your organization in Microsoft Teams, Apr. 15, 2024, https://learn.microsoft.com/en-us/microsoftteams/expand-teams-across-your-org/shifts/manage-the-shifts-app-for-your-organization-in-teams.

Polarity, SOC Series: Flawless Handoffs During Shift Change, Oct. 1, 2020, https://polarity.io/blog/soc-series-flawless-handoffs-during-shift-change/.

International Searching Authority, "Notification of Transmittal of the International Search Report and the Written Opinion of the International Searching Authority, or Declaration," Patent Cooperation Treaty Sep. 22, 2025, 06 pages, International Application No.-PCT/IB2025/054938, IBM Docket No. P202303527PCT01.

\* cited by examiner

CONSOLIDATED MULTI-CHANNEL MULTI-USER OPERATIONS MANAGEMENT USING AGENTS

BACKGROUND

The present invention relates generally to computer system operations management. More particularly, the present invention relates to a method, system, and computer program for consolidated multi-channel multi-user operations management using agents.

Computer systems are typically managed in groups, in a data center, often for multiple customers concurrently. Computer system operations management includes the systems and workflows that keep systems in the data center running, including configuring and maintaining compute, network, storage, and memory resources in response to users' needs, ensuring security for the data center and the systems installed in the data center, and monitoring systems that take care of power and cooling the data center. Teams of workers, typically supporting multiple customers simultaneously, oversee automated monitoring and workflows, working in shifts to provide coverage at all times of the day or night. To ensure continuity over shift changes, information about ongoing and resolved security incidents, planned changes to managed resources, and past, present, and future events must be communicated between team members going off shift and other team members starting their shifts.

SUMMARY

The illustrative embodiments provide for consolidated multi-channel multi-user operations management using agents. An embodiment includes configuring a first agent to monitor a first communication channel from a first client. The embodiment includes converting, by the first agent, a first communication to a central format, the first communication received via the first communication channel in a first format at a first time. The embodiment includes extracting, by the first agent, first incident data from the first communication. The embodiment includes extracting, from an incident database, by a central agent at a second time later than the first time, first client data including the first incident data. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
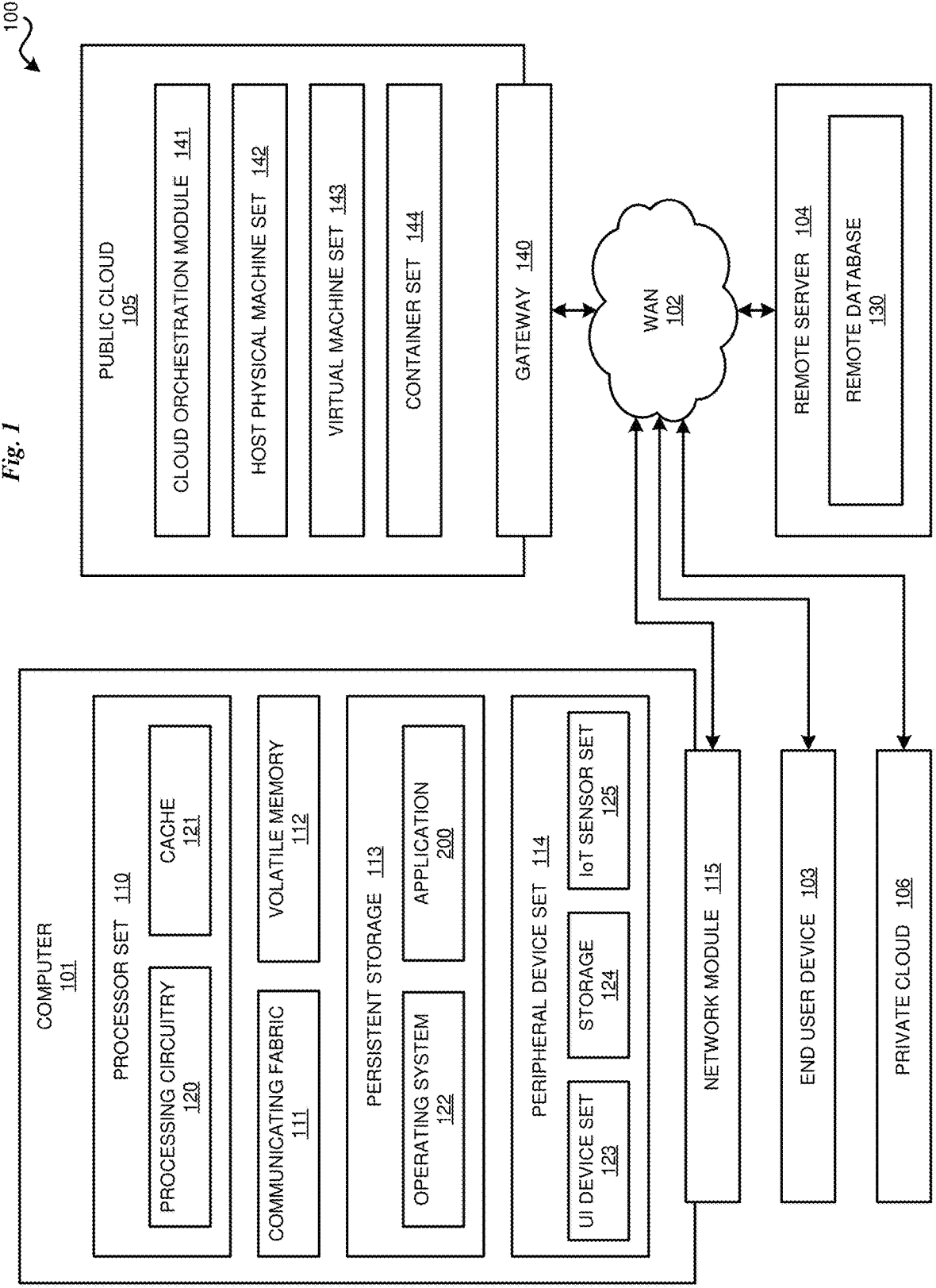
FIG. 1 depicts a block diagram of a computing environment in accordance with an illustrative embodiment.

The illustrative embodiments recognize that existing computer system operations management solutions that include a team member communications component require that team members all use the same application (e.g., a messaging application or a team management application) or the same communications format (e.g., text messaging or email) to communicate with each other. Other existing computer system operations management solutions do not include a team member communications component, instead relying on receiving automated incident reports directly from a system monitoring component or having users enter incident reports and other event and status data manually. Other existing computer system operations management solutions use a diverse collection of system monitoring, report generation, and communication applications, and rely on team members to manually manage these diverse inputs and brief the next shift on an ad hoc basis.

However, the illustrative embodiments also recognize that manually managing diverse inputs often results in something being forgotten or ineffectively managed, thus requiring additional work by team members to remedy the oversight. For example, a customer might alert the data center, via text message, that a particular server will be involved in a load test for the next 24 hours, and this is not indicative of a threat incident to the server. However, if the team member receiving the request fails to pass the alert to his or her replacement at shift change, the next team member might think an incident is indeed occurring, causing the unnecessary additional work the customer initially sought to prevent.

Team members might not all have access to the same communication channel, or have individual communication channel preferences. As well, customers do not typically use the same management solution as team members, resent being required to use only one communications channel, and instead communicate their needs to data center staff via a variety of communication channels (e.g., application or device-based text messaging, or email). Even if a customer were willing to use team members' management solution, for data security reasons customers and team members should not have the same data access privileges, and existing management solutions do not support the type of guest access required to implement customer-specific data access privileges. Thus, the illustrative embodiments recognize that there is an unmet need to consolidate data from multiple communication channels and modalities into one multi-user computer operations management solution.

The present disclosure addresses the deficiencies described above by providing a process (as well as a system, method, machine-readable medium, etc.) that configures a first agent to monitor a first communication channel from a first client; converts, by the first agent, a first communication to a central format, the first communication received via the first communication channel in a first format at a first time; extracts, by the first agent, first incident data from the first communication; and extracts, from an incident database, by a central agent at a second time later than the first time, first client data including the first incident data. Thus, the illustrative embodiments provide for consolidated multi-channel multi-user operations management using agents.

An illustrative embodiment configures one or more agents to each monitor a particular communication channel from a particular client or team member. A communication channel is a means of communicating data from one application to another. Some non-limiting examples of communication channels are data interchange interfaces used by system monitoring or system management applications, such as an interface using an Application Programming Interface (API), an interface based on Standard Query Language (SQL) queries, and an interface based on monitoring logging entries in an event log. Some other non-limiting examples of communication channels are messaging-based communication channels, such as email, text messages exchanged within a communications application or a social media platform (e.g., chats or direct messages), text messages exchanged between different communications applications, social media platforms, or devices (e.g., Short Messaging System (SMS) based messaging), and additional communication modalities converted to text form (e.g., a voice message converted to corresponding text). For example, in a computer system operations management implementation, one embodiment might configure agents to monitor each of a system monitoring application, email mailbox, chat platform, incident ticketing system used to manage incidents from reporting until resolution, security orchestration, automation, and response (SOAR) application, and threat intelligence feed, each using a particular communication channel. Because agents each monitor a particular communication channel independently of each other, an embodiment adds support for a new instance of a communication channel, a new type of communication channel, or a new client in a modular fashion, by configuring a new agent to monitor the new type of communication channel or new client without affecting the functionality of existing agent(s) monitoring existing communication channel(s).

In an embodiment, at a first time, an agent receives a communication via the communication channel the agent is monitoring. For example, an agent configured to monitor an API interface might receive a report of a system event via the API interface, or an agent configured to monitor incoming email or text messages might receive a message requesting that a system be reconfigured, alerting the data center to a planned test, or reporting a problem.

In an embodiment, an agent converts a received communication to a central format. The central format is a format supported by all agents monitoring communication channels, as well as a central agent described elsewhere herein. One non-limiting example of a central format is a data structure expressed in a JSON (JavaScript Object Notation) format including fields holding specific types of data, such as a field holding a timestamp for receipt of a communication including data of an incident, another field identifying a computer system affected by contents of the communication, and another field identifying a source of the communication. Another non-limiting example of a central format is a data structure expressed in an extensible Markup Language (XML) format. Another non-limiting example of a central format is a data structure expressed in format other than JSON or XML. Another non-limiting example of a central format is a text summary of a communication, with specific elements of the communication placed in a specific order in the text summary. In one embodiment, an agent uses a presently available rule-based conversion technique and one or more business rules specifying the central format to extract incident data from the received communication and populate a data structure, in the central format, with the extracted incident data. In another embodiment, an agent uses a presently available natural language processing technique such as a large language model and one or more business rules specifying translators from an incoming format to the central format to extract incident data from the received communication and populate a data structure, in the central format, with the extracted incident data. In another embodiment, an agent uses a presently available text summarization technique (e.g., a large language model or generative artificial intelligence model) to generate a text summary of a communication in the central format. Other techniques for extracting, by the first agent, incident data from a received communication are also possible and contemplated within the scope of the illustrative embodiments. An embodiment stores extracted incident data in an incident database or other data repository.

An embodiment configures a central agent to monitor the incident database and extract data from the incident database. One embodiment configures a central agent to extract data from the incident database at a second time later than the time at which incident data was stored in the incident database. In one embodiment, the extracted data is data of a particular client or customer and includes the incident data stored in the incident database. For example, the second time might be a shift change time, and the extracted data includes data of ongoing incidents that team members on the new shift should be aware of to perform their duties.

In some embodiments, the central agent also monitors a time lag between the shift change and a team member on the new shift accessing or updating data of a particular incident. If the time lag exceeds a threshold value, the central agent notifies one or more team members or other users that the incident has been unaddressed for too long. In some embodiments, the central agent also monitors other time-based parameters, such as a time lag between when an incident is first reported and when a team member begins work on the incident, and takes alerting or reminding actions if the time lag exceeds a threshold value. In one embodiment, the central agent adjusts the threshold value based on one or more business rules (e.g., a service-level agreement with a client specifying how long an incident, or a particular type of incident, may be unaddressed). In another embodiment, the central agent adjusts the threshold value based on computing an average time incidents, or a particular type of incident, go unaddressed. In another embodiment, the central agent uses a machine learning model and a presently available machine learning technique to generate an estimated response time, and set a threshold value, based on factors such as incident priority, how long it has been since an incident was first reported or updated, how many incidents or incidents of a particular type or priority are currently pending, and the like.

In one embodiment, the central agent presents consolidated incident data organized by client, helping a team member to quickly identify and focus on incidents specific to each client during a handover at shift change. In another embodiment, the central agent presents consolidated incident data organized by incidents' priority level. For example, the central agent might present all the priority one incidents first, then all the priority two incidents, then all the priority three incidents. Grouping incidents by their priority helps team members prioritize their workload, addressing the highest-priority incidents before lower-priority incidents. In another embodiment, the central agent presents consolidated incident data organized by incident type, such as malware infections, network breaches, system vulnerabilities, or suspicious activities. Categorizing incidents helps route specific incident types to the team member best suited to handle that type of incident. In another embodiment, the central agent presents consolidated incident data organized by work done (e.g., actions taken, investigations performed, and any mitigation measures implemented) and work pending (e.g., further analysis, escalation, or incident closure) for an incident. In another embodiment, the central agent presents consolidated incident data organized by one or more of the client, incident priority level, incident type, and work done or pending. In embodiments, the configuration and organization of the central agent's presentation, as well as when the presentation is provided and to which users, is based on one or more business rules. Providing users a structured view of incidents helps enable a smoother handover from one shift to another, helps improve incident management efficiency, and provides a consolidated, organized presentation of incident data sourced from multiple, disparate communication channels.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 implementing consolidated multi-channel multi-user operations management using agents. In addition to application 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and application 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in application 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
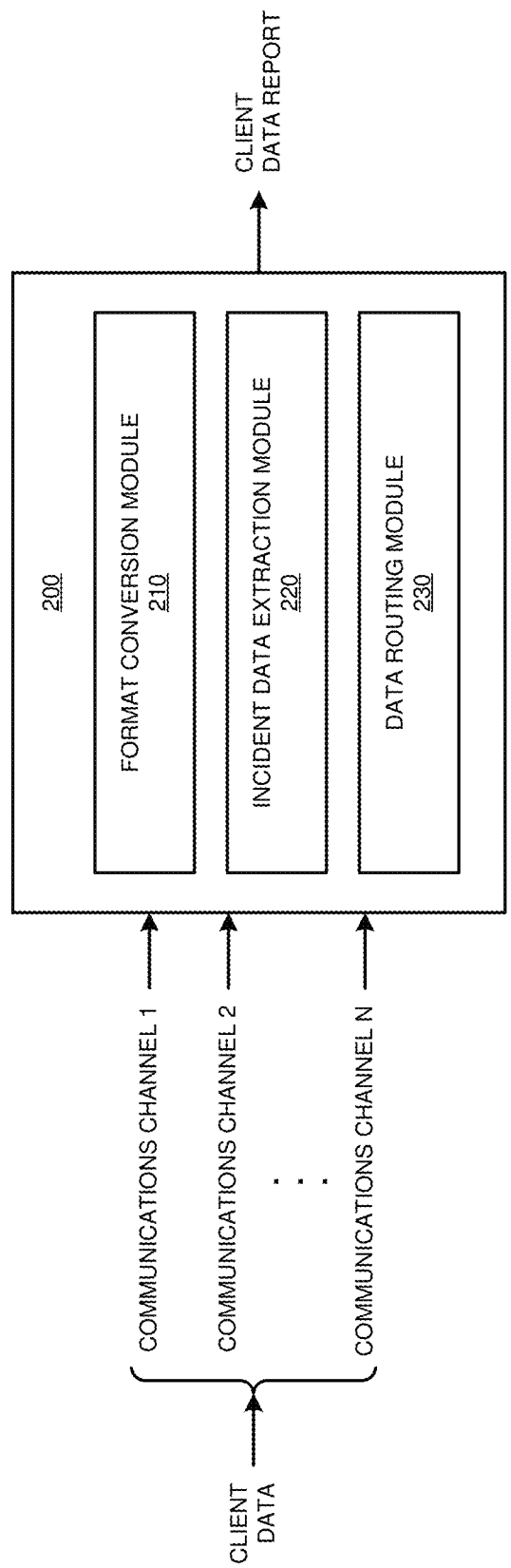
FIG. 2 depicts a block diagram of an example configuration for consolidated multi-channel multi-user operations management using agents in accordance with an illustrative embodiment.

With reference to FIG. 2, this figure depicts a block diagram of an example configuration for consolidated multi-channel multi-user operations management using agents in accordance with an illustrative embodiment. Application 200 is the same as application 200 in FIG. 1.

In the illustrated embodiment, format conversion module 210 configures one or more agents to each monitor a particular communication channel from a particular client or team member. A communication channel is a means of communicating data from one application to another. Some non-limiting examples of communication channels are data interchange interfaces used by system monitoring or system management applications, such as an interface using an API, an interface based on SQL queries, and an interface based on monitoring logging entries in an event log. Some other non-limiting examples of communication channels are messaging-based communication channels, such as email, text messages exchanged within a communications application or a social media platform (e.g., chats or direct messages), text messages exchanged between different communications applications, social media platforms, or devices (e.g., SMS based messaging), and additional communication modalities converted to text form (e.g., a voice message converted to corresponding text). For example, in a computer system operations management implementation, one implementation of module 210 might configures agents to monitor each of a system monitoring application, email mailbox, chat platform, incident ticketing system used to manage incidents from reporting until resolution, SOAR application, and threat intelligence feed, each using a particular communication channel. Because agents each monitor a particular communication channel independently of each other, module 210 adds support for a new instance of a communication channel, a new type of communication channel, or a new client in a modular fashion, by configuring a new agent to monitor the new type of communication channel or new client without affecting the functionality of existing agent(s) monitoring existing communication channel(s).

In an embodiment, at a first time, an agent receives a communication via the communication channel the agent is monitoring. For example, an agent configured to monitor an API interface might receive a report of a system event via the API interface, or an agent configured to monitor incoming email or text messages might receive a message requesting that a system be reconfigured, alerting the data center to a planned test, or reporting a problem.

In module 210, an agent converts a received communication to a central format. The central format is a format supported by all agents monitoring communication channels, as well as a central agent described elsewhere herein. One non-limiting example of a central format are a data structure expressed in a JSON (JavaScript Object Notation) format including fields holding specific types of data, such as a field holding a timestamp for receipt of a communication including data of an incident, another field identifying a computer system affected by contents of the communication, and another field identifying a source of the communication. Another non-limiting example of a central format is a data structure expressed in an extensible Markup Language (XML) format. Another non-limiting example of a central format is a data structure expressed in format other than JSON or XML. Another non-limiting example of a central format is a text summary of a communication, with specific elements of the communication placed in a specific order in the text summary. In one implementation of module 210 and incident data extraction module 220, an agent uses a presently available rule-based conversion technique and one or more business rules specifying the central format to extract incident data from the received communication and populate a data structure, in the central format, with the extracted incident data. In another implementation of modules 210 and 220, an agent uses a presently available natural language processing technique such as a large language model and one or more business rules specifying translators from an incoming format to the central format to extract incident data from the received communication and populate a data structure, in the central format, with the extracted incident data. In another implementation of module 210, an agent uses a presently available text summarization technique (e.g., a large language model or generative artificial intelligence model) to generate a text summary of a communication in the central format, and module 220 uses a presently available text extraction technique to extract incident data from the generated text summary. Other techniques for extracting, by the first agent, incident data from a received communication are also possible. Module 220 stores extracted incident data in an incident database or other data repository.

Data routing module 230 configures a central agent to monitor the incident database and extract data from the incident database. One implementation of module 230 configures a central agent to extract data from the incident database at a second time later than the time at which incident data was stored in the incident database. In one implementation of module 230, the extracted data is data of a particular client or customer and includes the incident data stored in the incident database. For example, the second time might be a shift change time, and the extracted data includes data of ongoing incidents that team members on the new shift should be aware of to perform their duties.

In some implementations of module 230, the central agent also monitors a time lag between the shift change and a team member on the new shift accessing or updating data of a particular incident. If the time lag exceeds a threshold value, the central agent notifies one or more team members or other users that the incident has been unaddressed for too long. In some implementations of module 230, the central agent also monitors other time-based parameters, such as a time lag between when an incident is first reported and when a team member begins work on the incident, and takes alerting or reminding actions if the time lag exceeds a threshold value. In one implementation of module 230, the central agent adjusts the threshold value based on one or more business rules (e.g., a service-level agreement with a client specifying how long an incident, or a particular type of incident, may be unaddressed). In another implementation of module 230, the central agent adjusts the threshold value based on computing an average time incidents, or a particular type of incident, go unaddressed. In another implementation of module 230, the central agent uses a machine learning model and a presently available machine learning technique to generate an estimated response time, and set a threshold value, based on factors such as incident priority, how long it has been since an incident was first reported or updated, how many incidents or incidents of a particular type or priority are currently pending, and the like.

In one implementation of module 230, the central agent presents consolidated incident data organized by client, helping a team member to quickly identify and focus on incidents specific to each client during a handover at shift change. In another implementation of module 230, the central agent presents consolidated incident data organized by incidents' priority level. For example, the central agent might present all the priority one incidents first, then all the priority two incidents, then all the priority three incidents. Grouping incidents by their priority helps team members prioritize their workload, addressing the highest-priority incidents before lower-priority incidents. In another implementation of module 230, the central agent presents consolidated incident data organized by incident type, such as malware infections, network breaches, system vulnerabilities, or suspicious activities. Categorizing incidents helps route specific incident types to the team member best suited to handle that type of incident. In another implementation of module 230, the central agent presents consolidated incident data organized by work done (e.g., actions taken, investigations performed, and any mitigation measures implemented) and work pending (e.g., further analysis, escalation, or incident closure) for an incident. In another implementation of module 230, the central agent presents consolidated incident data in a report organized by one or more of the client, incident priority level, incident type, and work done or pending. In implementations of module 230, the configuration and organization of the central agent's presentation, as well as when the presentation is provided and to which users, is based on one or more business rules. Providing users a structured view of incidents helps enable a smoother handover from one shift to another, helps improve incident management efficiency, and provides a consolidated, organized presentation of incident data sourced from multiple, disparate communication channels.

Figure 3:
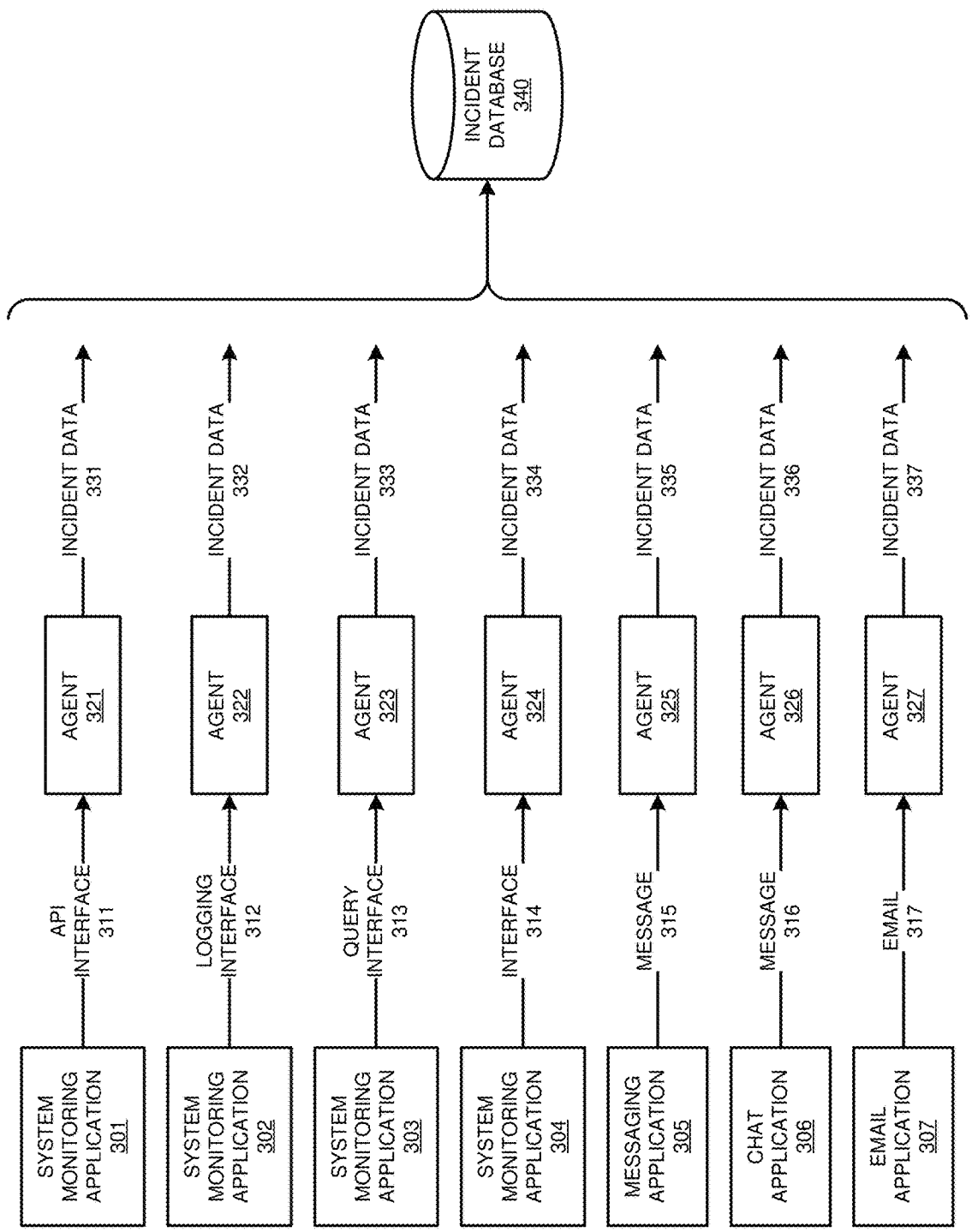
FIG. 3 depicts an example of consolidated multi-channel multi-user operations management using agents in accordance with an illustrative embodiment.

With reference to FIG. 3, this figure depicts an example of consolidated multi-channel multi-user operations management using agents in accordance with an illustrative embodiment. The example can be executed using application 200 in FIG. 2.

As depicted, agent 321 is configured to monitor API interface 311, a communications channel from system monitoring application 301, and generates incident data 331. Similarly, agent 322 is configured to monitor logging interface 312, a communications channel from system monitoring application 302, and generates incident data 332. Agent 323 is configured to monitor query interface 313, a communications channel from system monitoring application 303, and generates incident data 333. Agent 324 is configured to monitor interface 314, a communications channel from system monitoring application 304, and generates incident data 334. Agent 325 is configured to monitor message 315, sent over a communications channel from messaging application 305, and generates incident data 335. Agent 326 is configured to monitor message 316, sent over a communications channel from chat application 306, and generates incident data 336. Agent 327 is configured to monitor email 317, sent over a communications channel from email application 307, and generates incident data 337. Incident data 331, 332, 333, 334, 335, 336, and 337 are stored in incident database 340.

Figure 4:
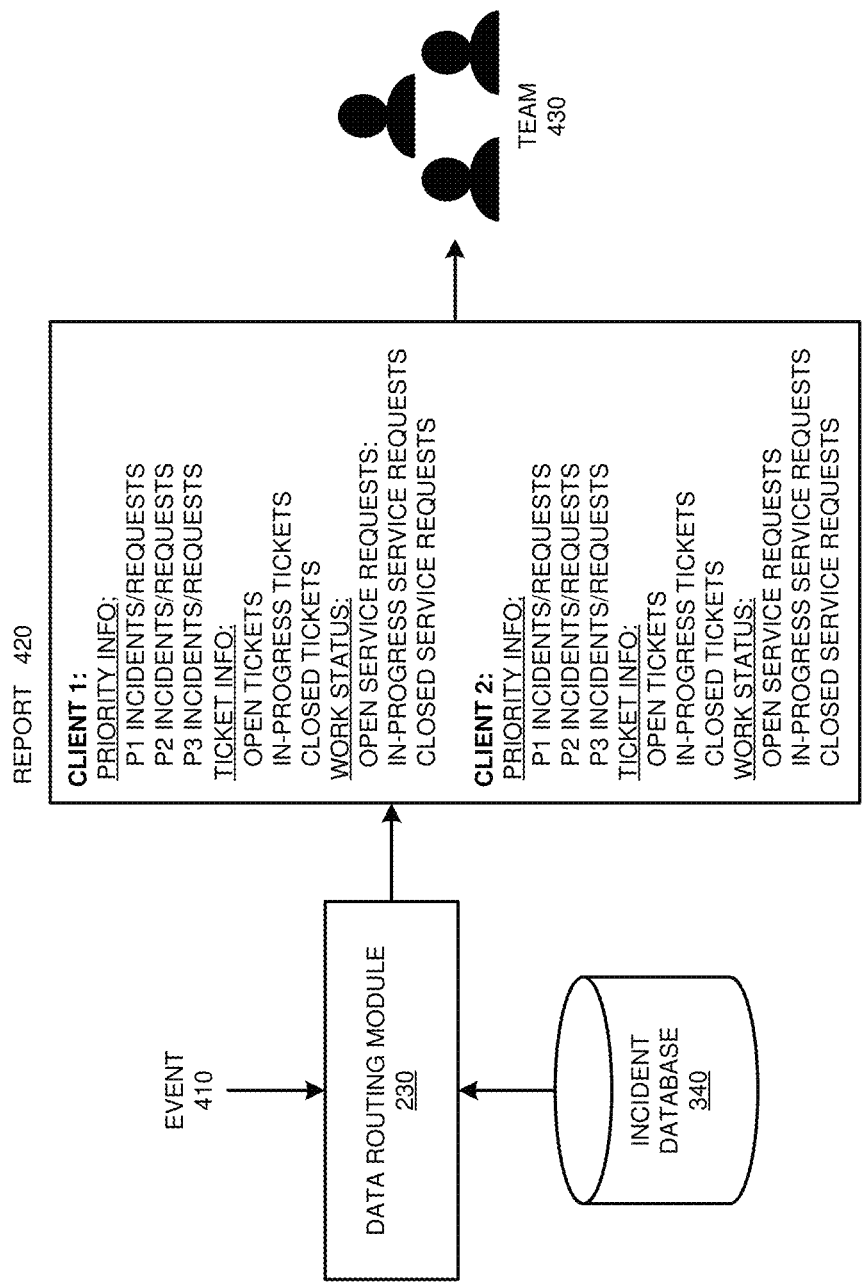
FIG. 4 depicts a continued example of consolidated multi-channel multi-user operations management using agents in accordance with an illustrative embodiment.

With reference to FIG. 4, this figure depicts a continued example of consolidated multi-channel multi-user operations management using agents in accordance with an illustrative embodiment. Data routing module 230 is the same as data routing module 230 in FIG. 2. Incident database 340 is the same as incident database 340 in FIG. 3.

As depicted, event 410 (e.g., a shift change) occurs, and data routing module 230 configures a central agent to extract data from incident database 340, generating report 420 and presenting report 420 to team 430, a team responsible for managing incidents such as those reported in report 420.

Figure 5:
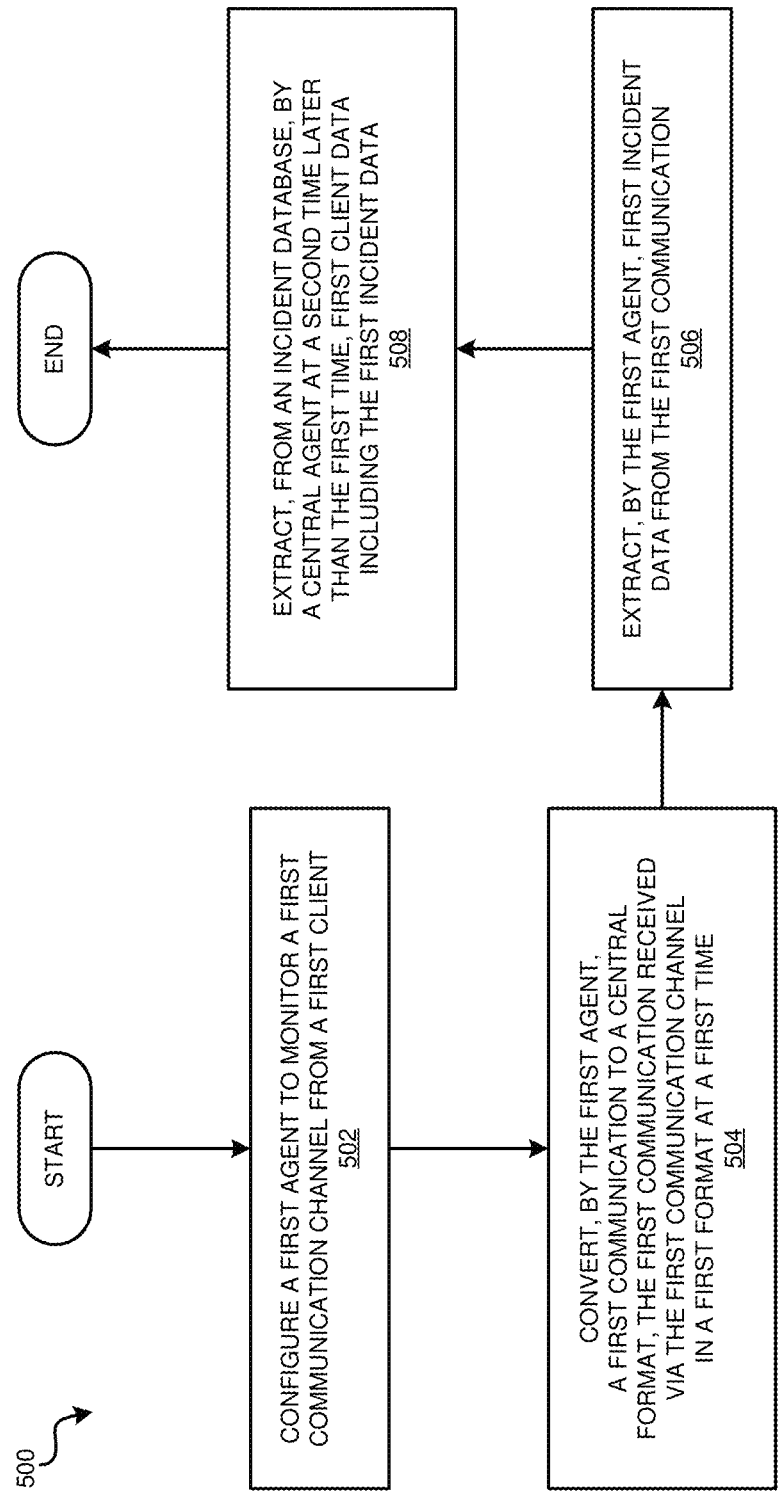
FIG. 5 depicts a flowchart of an example process for consolidated multi-channel multi-user operations management using agents in accordance with an illustrative embodiment.

With reference to FIG. 5, this figure depicts a flowchart of an example process for consolidated multi-channel multi-user operations management using agents in accordance with an illustrative embodiment. Process 500 can be implemented in application 200 in FIG. 2.

In the illustrated embodiment, at block 502, the process configures a first agent to monitor a first communication channel from a first client. At block 504, the process converts, by the first agent, a first communication to a central format, the first communication received via the first communication channel in a first format at a first time. At block 506, the process extracts, by the first agent, first incident data from the first communication. At block 508, the process extracts, from an incident database, by a central agent at a second time later than the first time, first client data including the first incident data. Then the process sends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    configuring a first agent to monitor a first communication channel from a first client;
    converting, by the first agent, a first communication to a central format, the first communication received via the first communication channel in a first format at a first time;
    extracting, by the first agent, first incident data from the first communication;
    monitoring, by a central agent, a time lag between a shift change and accessing the first incident data;
    notifying, by the central agent, upon a determination that the time lag exceeds a threshold value, one or more users that an incident has been unaddressed; and
    extracting, from an incident database, by the central agent at a second time later than the first time, first client data including the first incident data.

2. The computer-implemented method of claim 1, wherein the first communication channel comprises an Application Programming Interface (API).

3. The computer-implemented method of claim 1, wherein the first format and the central format are not identical to each other.

4. The computer-implemented method of claim 1, further comprising:
    storing, in the incident database, the first incident data.

5. The computer-implemented method of claim 1, further comprising:
    configuring a second agent to monitor a second communication channel from a second client;
    converting, by the second agent, a second communication to the central format, the second communication received via the second communication channel in a second format at a third time, wherein the first format and the second format are not identical to each other, wherein the third time is prior to the second time; and
    extracting, by the second agent, second incident data from the second communication.

6. The computer-implemented method of claim 1, further comprising:
    presenting, to a user during a shift change, the first client data.

7. A computer program product comprising one or more computer readable storage media, and program instructions collectively stored on the one or more computer readable storage media, the program instructions executable by a processor to cause the processor to perform operations comprising:
    configuring a first agent to monitor a first communication channel from a first client;
    converting, by the first agent, a first communication to a central format, the first communication received via the first communication channel in a first format at a first time;
    extracting, by the first agent, first incident data from the first communication;
    monitoring, by central agent, a time lag between a shift change and accessing the first incident data;
    notifying, by the central agent, upon a determination that the time lag exceeds a threshold value, one or more users that an incident has been unaddressed; and
    extracting, from an incident database, by the central agent at a second time later than the first time, first client data including the first incident data.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

10. The computer program product of claim 7, wherein the first communication channel comprises an Application Programming Interface (API).

11. The computer program product of claim 7, wherein the first format and the central format are not identical to each other.

12. The computer program product of claim 7, further comprising:
   storing, in the incident database, the first incident data.

13. The computer program product of claim 7, further comprising:
   configuring a second agent to monitor a second communication channel from a second client;
   converting, by the second agent, a second communication to the central format, the second communication received via the second communication channel in a second format at a third time, wherein the first format and the second format are not identical to each other, wherein the third time is prior to the second time; and
   extracting, by the second agent, second incident data from the second communication.

14. The computer program product of claim 7, further comprising:
   presenting, to a user during a shift change, the first client data.

15. A computer system comprising a processor and one or more computer readable storage media, and program instructions collectively stored on the one or more computer readable storage media, the program instructions executable by the processor to cause the processor to perform operations comprising:
   configuring a first agent to monitor a first communication channel from a first client;
   converting, by the first agent, a first communication to a central format, the first communication received via the first communication channel in a first format at a first time;
   extracting, by the first agent, first incident data from the first communication;
   monitoring, by central agent, a time lag between a shift change and accessing the first incident data;
   notifying, by the central agent, upon a determination that the time lag exceeds a threshold value, one or more users that an incident has been unaddressed; and
   extracting, from an incident database, by the central agent at a second time later than the first time, first client data including the first incident data.

16. The computer system of claim 15, wherein the first communication channel comprises an Application Programming Interface (API).

17. The computer system of claim 15, wherein the first format and the central format are not identical to each other.

18. The computer system of claim 15, further comprising:
   storing, in the incident database, the first incident data.

19. The computer system of claim 15, further comprising:
   configuring a second agent to monitor a second communication channel from a second client;
   converting, by the second agent, a second communication to the central format, the second communication received via the second communication channel in a second format at a third time, wherein the first format and the second format are not identical to each other, wherein the third time is prior to the second time; and
   extracting, by the second agent, second incident data from the second communication.

20. The computer system of claim 15, further comprising:
   presenting, to a user during a shift change, the first client data.

* * * * *